(12) United States Patent
Nishizawa et al.

(10) Patent No.: US 7,011,878 B2
(45) Date of Patent: *Mar. 14, 2006

(54) OPTICAL DISC

(75) Inventors: Akira Nishizawa, Yokohama (JP); Tetsuya Kondo, Yokohama (JP); Takeo Kojima, Kanagawa-Ken (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/973,390

(22) Filed: Oct. 27, 2004

(65) Prior Publication Data

US 2005/0089668 A1 Apr. 28, 2005

Related U.S. Application Data

(62) Division of application No. 10/243,827, filed on Sep. 16, 2002, now Pat. No. 6,815,032.

(30) Foreign Application Priority Data

Feb. 1, 2002 (JP) .............................. 2002-25298

(51) Int. Cl.
*B32B 3/02* (2006.01)

(52) U.S. Cl. .................. 428/64.1; 428/64.4; 428/64.5; 430/270.13; 156/272.2

(58) Field of Classification Search ............... 428/64.5; 430/270.13; 156/272.2, 272.8
See application file for complete search history.

(56) References Cited

U.S. PATENT DOCUMENTS

| 4,389,719 | A | 6/1983 | Van de Donk | 369/275 |
| 6,154,442 | A | 11/2000 | Kondo et al. | 369/286 |
| 6,676,791 | B1 * | 1/2004 | Kondo et al. | 156/209 |
| 6,815,032 | B1 * | 11/2004 | Nishizawa et al. | 428/64.1 |

FOREIGN PATENT DOCUMENTS

| EP | 0256554 A2 | 2/1988 |
| EP | 1052630 A1 | 11/2000 |
| EP | 1154420 A2 | 11/2001 |
| JP | 11-250558 | 9/1999 |
| JP | 2001-023243 | 1/2001 |
| JP | 2001-243659 | 9/2001 |
| JP | 2001-388723 | 9/2001 |

* cited by examiner

*Primary Examiner*—Elizabeth Mulvaney
(74) *Attorney, Agent, or Firm*—Jacobson Holman PLLC

(57) ABSTRACT

An optical disc has a support base and at least one information-retrieval layer formed over the support base. The information-retrieval layer is transparent and thinner than the support base. The information-retrieval layer exhibits variation in birefringence within ±20 nmpp (nano meter peak to peak) under double-pass measurements during one rotation of the optical disc.

4 Claims, 3 Drawing Sheets

OPTICAL DISC

This is a Divisional of application Ser. No. 10/243,827 filed Sep. 16, 2002, now U.S. Pat. No. 6,815,032.

BACKGROUND OF THE INVENTION

The present invention relates to an optical disc having an information-retrieval layer for enhanced high signal quality in recording and reproduction.

Optical discs are a storage medium having a transparent plastic support base on which information signals are recorded as minute uneven pit trains or grooves. The information signals are retrieved by emission of laser beams from the surface opposite to the information-recorded surface while intensity of the reflected laser beams is varying in accordance with the recorded information.

This type of optical disc has been widely used, one representative being compact discs (CD) usable at 780 nm-wavelength of recording and retrieving laser beams and 0.45-aperture number of optical-pickup objective lens.

The types of compact disc ranges from read-only type discs (ROM) for information retrieval only, recording type discs (CD-R) to which recording is allowed only once to recording/retrieval type discs (CD-RW) to which recording, retrieval and erasure are allowed several times. Another type is magneto-optical discs having shape similar to these compact discs.

Thanks to reasonable cost for short-wave laser devices and advanced disc-manufacturing technology, the most popular disc is a digital versatile disc (DVD) usable at 635 nm-wavelength of recording and retrieving laser beams and 0.6-aperture number of optical pickup objective lens. High disc density has been achieved thanks to short laser wavelength and high objective-lens aperture number.

Moreover, expected as the next-generation discs are optical discs more dense than DVD, usable at 400 nm-wavelength (or shorter) of recording and retrieving laser beams and 0.7-aperture number (or higher) of optical-pickup objective lens.

The thickness of transparent support base via which information signals are retrieved for optical discs, such as CD, is 1.2 mm usable at 780 nm-wavelength of recording and retrieving laser beams. Formed on the transparent support base is an information-recorded layer such as pit trains and grooves. The information on the information-recorded layer is retrieved from the rear surface. The transparent support base having the information-recorded layer is formed as a transparent retrieval layer.

Optical discs, such as DVD, more dense than CD, have a 0.6 mm-thick transparent information-retrieval support base usable at 635 nm-wavelength of recording and retrieving laser beams. Formed on this transparent support base is an information-recorded layer such as pit trains and grooves. The information on the information-recorded layer is retrieved from the rear surface. The transparent support base having the information-recorded layer is formed as a transparent retrieval layer, like CD. This type of optical discs, however, have a 0.6 mm-disc, called dummy disc for high disc strength.

The next-generation optical discs, usable at 400 nm-wavelength of recording and retrieving laser beams, have an information-recorded layer such as pit trains and grooves formed on a support base having thickness in the range from 1.1 to 1.2 mm. Stuck on the information-recorded layer is a sheet having thickness 0.2 mm or less for recording and retrieval via this sheet surface. One type of next-generation optical disc has such information-recorded layer formed on a transparent retrieval layer.

As discussed, the thickness of optical disc has become thinner as the wavelength of recording and retrieving laser beams has become shorter. In addition, increase in objective-lens aperture number in optical pickup contributes to further high density.

The next-generation discs usable at 400 nm-wavelength of recording and retrieving laser beams and 0.7 (or higher)-aperture number of optical-pickup objective lens usually have thickness of 0.2 mm or less for the information-retrieval layer from the information-recorded surface on which pits or grooves have been formed as information signals to the information-retrieval surface.

Such a thin information-retrieval layer prevents laser beams from diverging during recording and retrieving due to increase in optical aberration such as spherical aberration caused by increase in lens aperture number and coma aberration caused when the disc is bent.

The thinner the information-retrieval layer, however, the more difficult in forming an information-recorded layer on an information-retrieval layer by injection molding like DVD when the support base is 0.6 mm-thick. This is because molding resin will not be filled enough in a molding die by injection molding when a support base is too thin against its diameter, resulting in incomplete formation of information-recorded layer.

To solve such a problem, these next-generation optical discs are manufactured by forming an information-recorded layer on a support base having a thickness of 1.1 mm, for example, by injection molding, followed by forming an information-retrieval layer with an aluminum reflecting film on the information-recorded layer by sputtering, a bonding layer formed on the reflecting film and further a transparent plastic disc sheet having a thickness of 0.1 mm, for example, on the bonding layer.

Evaluation tests revealed, however, that these next-generation optical discs having a 0.1 mm-thick transparent plastic disc as the information-retrieval layer suffer from large variation in reproduced waveforms per one disc rotation. It is further revealed that one cycle of variation in reproduced waveforms mostly has two-cycle components.

An automatic gain controller suppresses such variation a little bit, but still not enough against asymmetry and degraded frequency characteristics of the varied output waveforms, thus providing no constant output.

Several sample discs suffered from peak-to-peak variation in reproduced waveforms, some reproducing output almost half of the minimum level.

The variation in reproduced output peculiar to the next generation optical discs having such thin information-retrieval layer cause increase in output errors, an inevitable halt to normal retrieval operation.

SUMMARY OF THE INVENTION

A purpose of the present invention is to provide an optical disc exhibiting preferable reproduction characteristics while suppressing variation in reproduced output.

The present invention provides an optical disc includes: a support base; and at least one information-retrieval layer formed over the support base, the information-retrieval layer being transparent, thinner than the support base and exhibiting variation in birefringence within ±20 nmpp (nano meter peak to peak) under double-pass measurements during one disc rotation.

Moreover, the present invention provides an optical disc includes: a support base; and a transparent sheet acting as an information-retrieval layer, stuck over the support base, the sheet being thinner than the support base, the sheet exhibiting variation in birefringence within ±20 nmpp (nano meter peak to peak) during one rotation under double-pass measurements.

Furthermore, the present invention provides an optical disc includes: a support base; and a transparent sheet acting as an information-retrieval layer, stuck over the support base, the sheet being thinner than the support base, a draw ratio for the sheet being adjusted so that the sheet exhibits variation in birefringence within ±20 nmpp (nano meter peak to peak) during one rotation.

DETAILED DESCRIPTION OF PREFERRED EMBODIMENTS

Preferred embodiments according to the present invention will be disclosed with reference to the attached drawings.

Figure 1:
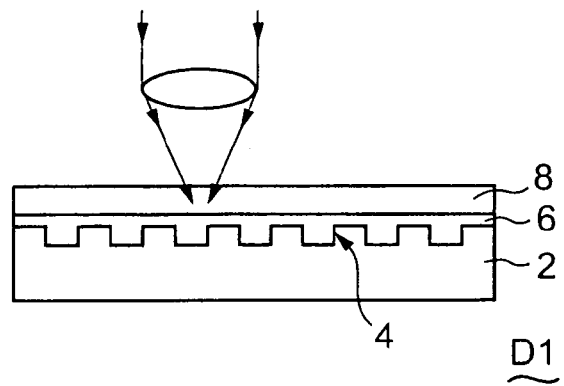
FIG. 1 is a sectional view illustrating an embodiment of an optical disc according to the present invention.

As shown in FIG. 1, an optical disc D1 according to the present invention has a disc-like support base 2 having a specific thickness. Formed on the surface of the support base 2 is an information-recorded layer 4 of pit trains or grooves of fine concavity and convexity carrying information signals, with a very thin reflective thin film (not shown) formed on the layer 4. Bonded on the thin reflective thin film via a bonding layer 6 is an information-retrieval layer 8 of a very thin transparent sheet.

The support base 2 may be made of polycarbonate resin. The reflective thin film may be of an aluminum film. The bonding layer 6 may be made of ultraviolet-hardened resin. The information-retrieval layer 8 may be of a plastic (resin) sheet of polycarbonate. In addition, the plastic (resin) sheet may be covered with a hard coat (not shown) against damages for a double-layered information-retrieval layer.

One of the features of the optical disc D1 according to the present invention is that the information-retrieval layer 8 made of such a very thin transparent sheet is thinner than the support base 2.

Another feature of the optical disc D1 according to the present invention is that variation in birefringence on the information-retrieval layer 8 during one rotation of the disc D1 is set within ±20 nmpp (nano meter peak to peak) among components of birefringence under double-pass measurements.

Figure 2:
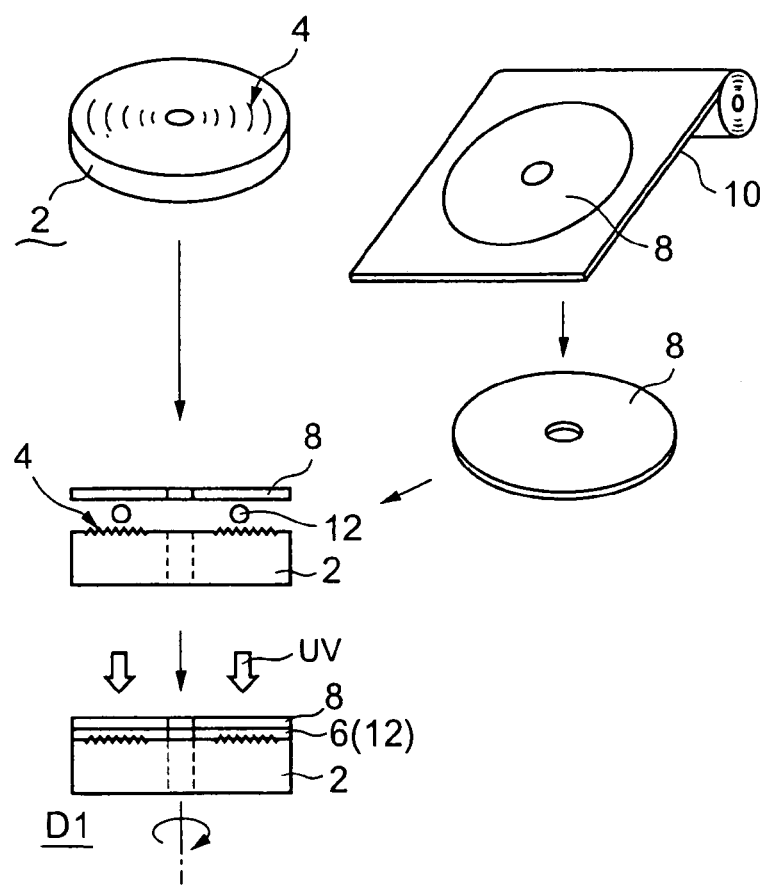
FIG. 2 illustrates a method of manufacturing the optical disc shown in FIG. 1.

In a method of manufacturing the optical disc D1, as shown in FIG. 2, a disc-like sheet almost the same size as the disc-like support base 2 is cut out from a roll of a plastic sheet 10 having the characteristics of birefringence within ±20 nmpp during one rotation under double-pass measurements. This cut-out sheet is employed as the information-retrieval layer 8.

A bonding layer 12 of ultraviolet-hardened resin is placed on the information-recorded layer 4 that has already been formed on the support base 2. The disc-sheet information-retrieval layer 8 is placed on the bonding layer 12. The support base 2 is rotated by a spinner to spread the ultraviolet-hardened resin over the layers. The resin is hardened by a UV (UltraViolet) light to join the layers, thus finishing the optical disc D1.

It is achieved that variation in reproduced output from the optical disc D1 is drastically suppressed because of reduction in birefringence variation during one disc rotation.

The thickness of the sheet 10 to be used for the information-retrieval layer 8 is preferably 0.2 mm or less. The minimum thickness for the sheet 10 is, however, about 50 μm at present due to difficulty in production.

The birefringence variation during one disc rotation is preferably within ±10 nmpp (nano meter peak to peak) under double-pass measurements.

Disclosed next are several methods of producing a sheet to be used for the information-retrieval layer 8.

A transparent sheet having a thickness of 0.2 mm or less is usually called a just sheet available in the market.

In general, melted plastic is kneaded and passed through a pair of rollers having a specific gap, thus producing a sheet of a specific thickness. The sheet is processed into a final thickness and flatness by a calender roll and a drawing machine. Drawing may be performed in the direction of sheet length or in two directions of sheet length and width. The more drawn, the higher the elasticity for some types of sheet material.

Or, a sheet a little bit thicker than a final product may be produced by extrusion molding. This sheet is drawn by a calender roll for desired thickness and flatness. Moreover, resin is dissolved in a solvent and then spread into a sheet while the solvent is evaporating with almost no drawing operations.

The inventors of the present invention selected a sheet exhibiting variation in birefringence within ±20 nmpp (nano meter peak to peak) during one rotation under double-pass measurements, among several sheets produced as explained above.

The selected sheet was cut into the size of a disc support base. A transparent information-retrieval layer was formed on an information-recorded layer via a transparent bonding layer over the support base to finish several sample optical discs.

The sample optical discs were tested for evaluation of reproduced output. All samples produced in several ways exhibited variation in reproduced output synchronized with one disc rotation. Many of them exhibited two-cycle variation in output.

These sample discs were set on optical-disc birefringence measuring equipment offered by Adomond Science Co. for birefringence on the information-retrieval layer. The measurements showed two-cycle variation in birefringence on the information-retrieval layer per disc rotation with the less variation in birefringence, the less variation in reproduced output per rotation.

It is then revealed that variation in reproduced output per rotation is caused by variation in birefringence on the information-retrieval layer.

Also found through the measurements is that the lower the draw ratio, the less variation in birefringence occurs on the information-retrieval layer. It is thus revealed that variation in birefringence has a relation with draw ratio in sheet production. The cause seems to be a heavy stress applied to the sheets in the direction of drawing while being drawn. Such a heavy stress gives stress strain to the sheets to cause orientation of plastic molecules in the sheets, thus the more orientation, the more birefringence occuring.

The measurements taught that variation in birefringence during one rotation can be suppressed to a certain degree or less under drawing control in sheet production.

Under the measurements, the optical disc according to the present invention can be manufactured by using a disc transparent sheet that exhibits variation in birefringence at a certain level, for example, within ±20 nmpp (nano meter peak to peak) during one rotation, as the information-retrieval layer.

Materials of the plastic sheet to be used as the information-retrieval layer according to the present invention are transparent and preferably exhibit high thermal deformation temperature but low birefringence when formed into a sheet. Such materials are, for example, polycarbonate, polystyrene, amorphous polyolefine and acetate. Among them, polycarbonate is the best choice for its reasonable price and high yields in sheet production. Nevertheless, polycarbonate resin exhibits high birefringence (optical elasticity) originated to resin.

Drawing is, therefore, controlled so that orientation of polycarbonate molecules will be suppressed for low birefringence (optical elasticity) to provide sheets suitable for the optical discs according to the present invention, even from resin exhibiting high optical elasticity.

Disclosed next are several embodiments of optical disc according to the present invention and sample optical disc for comparison.

[Embodiment 1]

An optical-disc molding die was attached on an injection molding machine. As tamper for information formed had already been set in the molding die. The stamper was made of nickel, formed on which was a bit-train information track having a pit depth of 50 nm, the shortest pit length of 0.19 $\mu$m and a track pitch of 0.35 $\mu$m.

A support base 2 having a diameter of 120 mm, a bore diameter of 15 mm and a thickness of 1.2 mm was made from the optical-disc molding die.

The support base 2 was set in a sputtering system. A reflective thin film of aluminum having a thickness of 50 nm was formed on an information-recorded layer 4 of the support base 2.

The support base 2 was set on a spinner as the aluminum reflective thin film was on top of the base. An ultraviolet-hardened resin was dropped onto the reflective thin film to form a bonding layer 6.

A sheet 10 made of polycarbonate having a thickness of 100 $\mu$m, exhibiting variation in birefringence within ±20 nmpp (nanometer peak to peak) during one rotation under double-pass measurements was cut into a doughnut-like information-retrieval layer 8 having a major diameter of 119 mm and a minor diameter of 38 mm. The polycarbonate sheet 10 exhibited a low draw ratio.

The information-retrieval layer 8 was placed on the bonding layer 6 and rotated by the spinner to spread the ultraviolet-hardened resin over the reflective thin film to have a specific resin thickness. The sheet information-retrieval layer 8 was exposed to a UV light, so that the sheet was stuck on the support base 2, thus finishing an optical disc Da according to the first embodiment.

Figure 3:
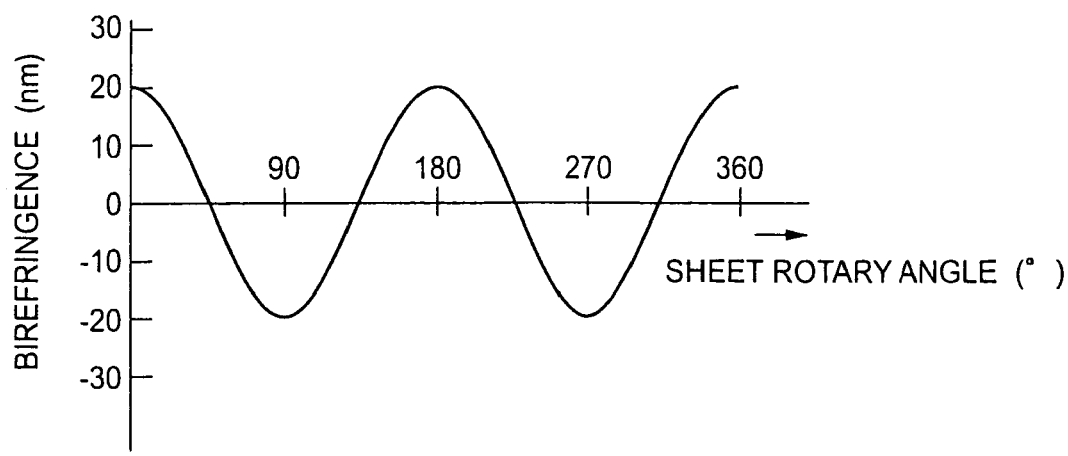
FIG. 3 is a graph indicating the results of double-pass measurements of birefringence on sheets to be used as an information-retrieval layer.

The optical disc Da was set on the optical-disc birefringence measuring equipment offered by Adomond Science Co. Birefringence was measured with laser beams having a wavelength of 780 nm incident at 80 to 90 degrees (almost vertical) while the optical disc Da was rotating. The measurements showed two-cycle variation in birefringence during one rotation of the optical disc Da, which was ±20 nmpp (nanometer peak to peak) under double-pass measurements, as shown in FIG. 3.

Moreover, the optical disc Da was set on a next-generation optical-disc player for an evaluation test at a wavelength of 400 nm for the retrieving laser beams and an aperture number of 0.85 for an optical-pickup objective lens.

Figure 4:
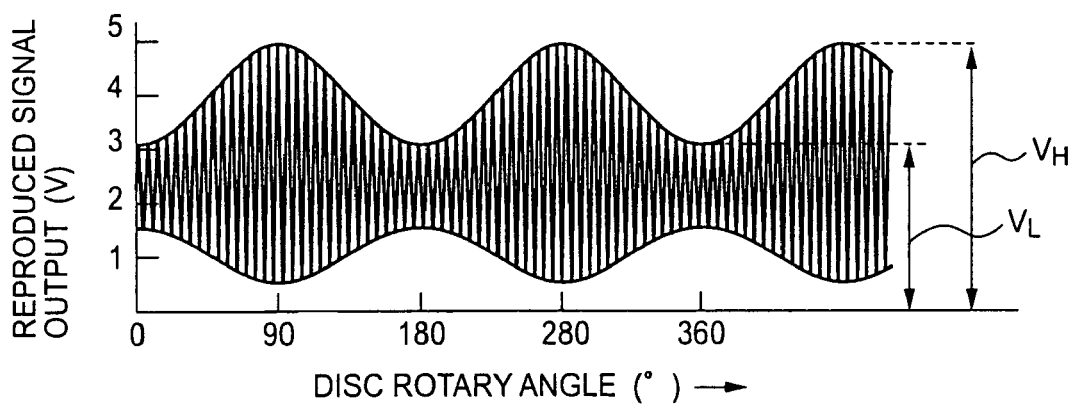
FIG. 4 is a graph indicating signal output reproduced from the optical discs according to the present invention.

The evaluation test showed two-cycle variation in peak-to-peak reproduced output during one rotation of the optical disc Da, as shown in FIG. 4. In detail, the variation in reproduced output was 15% obtained by dividing the difference between the maximum output $V_H$ and the minimum output $V_L$ by the maximum output $V_H$, or $(V_H-V_L)/V_H$.

Decreased with the variation in reproduced output, as shown in FIG. 4, were asymmetrical variation in reproduced output and a ratio of the shortest-length bit output to the longest-length bit output. Moreover, almost no errors occurred in decreased signal output. Overall evaluation of the optical disc Da according to the first embodiment resulted in high signal quality and stable tracking.

[Embodiment 2]

An optical disc Db according to the second embodiment was manufactured through the same procedures as the first embodiment, using a polycarbonate sheet having a thickness of 100 $\mu$m but exhibiting a draw ratio lower than that for the sheet used in the first embodiment.

The polycarbonate sheet used in the second embodiment exhibited ±10 nmpp (nano meter peak to peak) two-cycle birefringence during one disc rotation under measurements with the same birefringence measuring equipment as the first embodiment.

The evaluation test with the same next-generation optical-disc player as the first embodiment showed 10% two-cycle variation in reproduced output during one rotation of the optical disc Db.

Decreased with the variation in reproduced output were asymmetrical variation in reproduced output and a ratio of the shortest-length bit output to the longest-length bit output. Moreover, almost no errors occurred in decreased signal output. Overall evaluation of the optical disc Db according to the second embodiment resulted in high signal quality and stable tracking.

[Embodiment 3]

An optical disc Dc according to the third embodiment was manufactured through the same procedures as the first embodiment, using a polycarbonate sheet having a thickness of 100 $\mu$m but exhibiting a draw ratio lower than that for the sheet used in the second embodiment.

The polycarbonate sheet used in the third embodiment exhibited ±5 nmpp (nano meter peak to peak) two-cycle birefringence during one disc rotation under measurements with the same birefringence measuring equipment as the first embodiment.

The evaluation test with the same next-generation optical-disc player as the first embodiment showed 5% two-cycle variation in reproduced output during one rotation of the optical disc Dc.

Decreased with the variation in reproduced output were asymmetrical variation in reproduced output and a ratio of the shortest-length bit output to the longest-length bit output. Moreover, almost no errors occurred in decreased signal output. Overall evaluation of the optical disc Dc according to the third embodiment resulted in high signal quality and stable tracking.

[Sample 1]

An sample optical disc Dsa was manufactured through the same procedures as the first embodiment, but using a polycarbonate sheet having a thickness of 100 μm under drawing in two directions.

The polycarbonate sheet used for this sample exhibited ±45 nmpp (nano meter peak to peak) two-cycle birefringence during one disc rotation under measurements with the same birefringence measuring equipment as the first embodiment.

The evaluation test with the same next-generation optical-disc player as the first embodiment showed 25% two-cycle variation in reproduced output during one rotation of the sample optical disc Dsa, which was larger than the first to the third embodiments.

Increased with the variation in reproduced output were asymmetrical variation in reproduced output and a ratio of the shortest-length bit output to the longest-length bit output. Moreover, several errors occurred in decreased signal output. Overall evaluation of the sample optical disc Dsa resulted in low signal quality and unstable tracking.

[Embodiment 4]

A phase-change-optical-disc molding die was attached on an injection molding machine. A stamper for information formed had already been set in the molding die. The stamper was made of nickel, formed on which was a spiral-groove information track having a groove depth of 27 nm and a track pitch of 0.32 μm.

A support base 2 having a diameter of 120 mm, a bore diameter of 15 mm and a thickness of 1.2 mm was made from the optical-disc molding die.

The support base 2 was set in a sputtering system. A phase-change recorded thin film having a thickness of 170 nm was formed on an information-recorded layer 4 of the support base 2. The phase-change recorded thin film is a recorded thin film composed of several thin films of AgPdCu, $ZnS.SiO_2$, AgInSbTe and $ZnS.SiO_2$.

The support base 2 was set on a spinner as the phase-change recorded film was on top of the base. An ultraviolet-hardened resin was dropped onto the phase-change recorded film to form a bonding layer 6.

A sheet 10 made of polycarbonate having a thickness of 100 μm, exhibiting variation in birefringence within ±20 nmpp during one rotation under double-pass measurements was cut into a doughnut-like information-retrieval layer 8 having a major diameter of 119 mm and a minor diameter of 19 mm. The polycarbonate sheet 10 exhibited a low draw ratio.

The information-retrieval layer 8 was placed on the bonding layer 6 and rotated by the spinner to spread the ultraviolet-hardened resin over the phase-change recorded film to have a specific resin thickness. The sheet information-retrieval layer 8 was exposed to a UV light, so that the sheet was stuck on the support base 2, thus finishing an optical disc Dd according to the fourth embodiment.

The optical disc Dd was set on known optical-disc initializing equipment to have the information-recorded layer initialized.

The optical disc Dd was set on the optical-disc birefringence measuring equipment offered by Adomond Science Co. Birefringence was-measured with laser beams having a wavelength of 780 nm incident at 80 to 90 degrees (almost vertical) while the optical disc Dd was rotating. The measurements showed two-cycle variation in birefringence during one rotation of the optical disc Dd, which was ±20 nmpp (nanometer peak to peak) under double-pass measurements, like shown in FIG. 3.

Moreover, the optical disc Dd was set on a next-generation optical-disc recorder/player having specifications: a wavelength of 400 nm for the retrieving laser beams and an aperture number of 0.85 for an optical-pickup objective lens. A modulated signal with the shortest mark length of 0.15 μm was recorded on the optical disc Dd.

The evaluation test with the same optical-disc recorder/player showed two-cycle variation in peak-to-peak reproduced output during one rotation of the optical disc Dd, like shown in FIG. 4. In detail, the variation in reproduced output was 15% obtained by dividing the difference between the maximum output $V_H$ and the minimum output $V_L$ by the maximum output $V_H$, or $(V_H-V_L)/V_H$.

Decreased with the variation in reproduced output, like shown in FIG. 4, were asymmetrical variation in reproduced output and a ratio of the shortest-length bit output to the longest-length bit output. Moreover, almost no errors occurred in decreased signal output. Overall evaluation of the optical disc Dd according to the fourth embodiment resulted in high signal quality and stable tracking.

[Embodiment 5]

An optical disc De according to the fifth embodiment was manufactured through the same procedures as the fourth embodiment, using a polycarbonate sheet having a thickness of 100 μm but exhibiting a draw ratio lower than that for the sheet used in the fourth embodiment.

The polycarbonate sheet used in the fifth embodiment exhibited ±10 nmpp (nano meter peak to peak) two-cycle birefringence during one disc rotation under measurements with the same birefringence measuring equipment as the fourth embodiment.

The evaluation test with the same next-generation optical-disc recorder/player as the fourth embodiment showed 10% two-cycle variation in reproduced output during one rotation of the optical disc De.

Decreased with the variation in reproduced output were asymmetrical variation in reproduced output and a ratio of the shortest-length bit output to the longest-length bit output. Moreover, almost no errors occurred in decreased signal output. Overall evaluation of the optical disc De according to the fifth embodiment resulted in high signal quality and stable tracking.

[Embodiment 6]

An optical disc Df according to the sixth embodiment was manufactured through the same procedures as the fourth embodiment, using an acetate sheet having a thickness of 100 μm but exhibiting a draw ratio lower than that for the sheet used in the fifth embodiment.

The acetate sheet used in the sixth embodiment exhibited ±5 nmpp (nano meter peak to peak) two-cycle birefringence during one disc rotation under measurements with the same birefringence measuring equipment as the first embodiment.

The evaluation test with the same next-generation optical-disc recorder/player as the fourth embodiment showed 5% two-cycle variation in reproduced output during one rotation of the optical disc Df.

Decreased with the variation in reproduced output were asymmetrical variation in reproduced output and a ratio of the shortest-length bit output to the longest-length bit output. Moreover, almost no errors occurred in decreased signal output. Overall evaluation of the optical disc Df according to the sixth embodiment resulted in high signal quality and stable tracking.

[Sample 2]

An sample optical disc Dsb was manufactured through the same procedures as the fourth embodiment, but using a polycarbonate sheet having a thickness of 100 µm under drawing in two directions.

The polycarbonate sheet used for this sample exhibited ±45 nmpp (nano meter peak to peak) two-cycle birefringence during one disc rotation under measurements with the same birefringence measuring equipment as the fourth embodiment.

The evaluation test with the same next-generation optical-disc recorder/player as the fourth embodiment showed 25% two-cycle variation in reproduced output during one rotation of the sample optical disc Dsb, which was larger than the fourth to the sixth embodiments.

Increased with the variation in reproduced output were asymmetrical variation in reproduced output and a ratio of the shortest-length bit output to the longest-length bit output. Moreover, several errors occurred in decreased signal output. Overall evaluation of the sample optical disc Dsa resulted in low signal quality and unstable tracking.

As already discussed, it is revealed that the next generation optical discs having the information-recorded layer 4 on the support base 2 and the transparent information-retrieval layer 8, thinner than the base 2, on the layer 4 suffer low quality in reproduced signals due to variation in reproduced output caused by variation in birefringence on the information-retrieval layer 8 during one disc rotation.

This invention solves this problem by suppressing distribution of birefringence on the information-retrieval layer 8 can be a specific direction. In detail, such birefringence is suppressed by drawing in a specific direction at a specific draw ratio or less in sheet production.

The present invention is not limited to the several embodiments of optical discs having the information-recorded layer 4 on the support base 2 and the transparent information-retrieval layer 6 on the layer 4 via the bonding layer 8. In other words, several modifications are available as shown in FIGS. 5A to 5D.

Figure 5A:
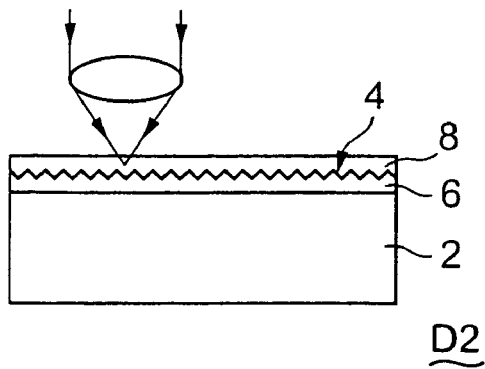
FIGS. 5A to 5D are sectional views illustrating modifications to the embodiment of optical disc according to the present invention.

An optical disc D2 shown in FIG. 5A has the information-recorded layer 4 formed, not on the support base 2, but between the bonding layer 6 and the top transparent information-retrieval layer 8.

Figure 5B:
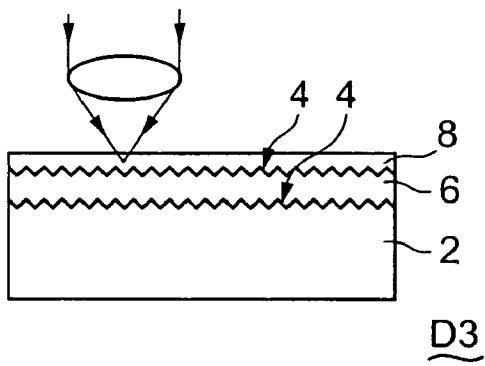

A double-layered optical disc D3 shown in FIG. 5B has two information-recorded layers 4, the first formed on the support base 2 and the second between the bonding layer 6 and the top transparent information-retrieval layer 8.

Figure 5C:
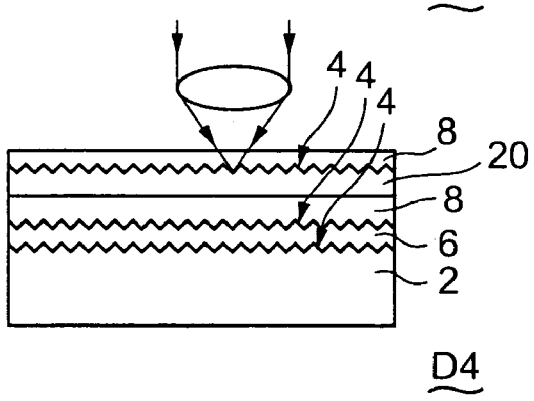

A multiple-layered optical disc D4 shown in FIG. 5C has three information-recorded layers 4, the first formed on the support base 2, the second between the bonding layer 6 and the middle transparent information-retrieval layer 8, and the third between a sheet layer 20 on the middle layer 8 and the top transparent information-retrieval layer 8.

Figure 5D:
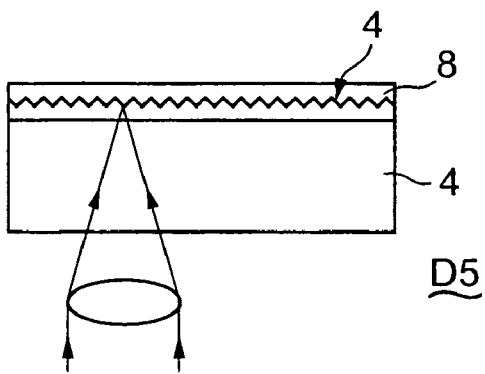

Moreover, an optical disc D5 shown in FIG. 5D (like CD with no recorded layer on a transparent support base) has an information-recorded layer 4 of ultraviolet-hardened resin, on the support base 2, formed by 2P molding. The support base 2 may be cut out from a 1.2 mm-thick sheet or a 0.6 mm-thick sheet for DVD.

The information-retrieval layer 8 may be of a double-layer structure of a plastic sheet and a hard-coat layer.

The hard-coat layer may be of thermally hardened resin that allows more than 70% of light at wavelength λ to pass therethrough, ultraviolet-hardened resin, visible-light-hardened resin, electron-beam-hardened resin, moisture-hardened resin, plural-liquid-mixture-hardened resin, solvent-contained-hardened resin, etc. Such materials for the hard coat layer are preferably at a certain level or higher in a pencil-scratch hardness test under JIS standards K5400 for high wear resistance.

In detail, such materials for the hard-coat layer are preferably at the level "H" or higher in the pencil-scratch hardness test under JIS standards K5400 against glass, the hardest material for an objective lens. The materials under the level "H" could suffer dust when the hard-coat layer is scratched, which results in high error rate. Thickness of the hard-coat layer is preferably 0.001 mm or thicker for high impact resistance but 0.01 mm or thinner against warp in the optical disc for its whole body.

Moreover, the hard-coat layer may be of a thin film of carbon, molybdenum or silicon, or an alloy including each of these metals (including oxide, nitride, sulphide, fluoride or carbide of these metals), formed by vacuum deposition. Thickness of the hard-coat layer of a thin film formed by vacuum deposition is preferably 1 nm or thicker for high impact resistance but 1000 nm or thinner against warp in the optical disc for its whole body.

The optical disc according to the present invention may be packed in a cartridge so that it can be easily set on a player and withstand rough handling. Moreover, the optical disc according to the present invention may be of several sizes, for example, in the range from 20 to 400 mm in diameter. In detail, the diameter may be 32, 41, 51, 60, 65, 80, 88, 130, 200, 300 and 356 mm in addition to a standard diameter 120 mm.

The signal format to be recorded on the optical discs is preferably a digitally modulated signal called (d, k) code. The (d, k)-modulated signal can be handled as either the fixed-length code or the variable-length code. The types of modulation suitable for recording signals on the optical discs are preferably (2, 10) modulation, (1, 7) modulation and (1, 9) modulation, all for fixed-length code, and also (2, 7) modulation and (1, 7) modulation, both for variable-length code.

Representatives of the (2, 10) modulation for fixed-length code are 8/15 modulation (disclosed in Japanese Unexamined Patent Publication No. 2000-286709), 8/16 modulation (EFM Plus) and 8/17 modulation (EFM).

One representative of the (1, 7) modulation for fixed-length code is D1, 7 modulation (disclosed in Japanese Unexamined Patent Publication No. 2000-332613.

One representative of the (1, 9) modulation for fixed-length code is D4, 6 modulation (disclosed in U.S. Patent Published Application No. 2002-0093751 A1.

One representative of the (1, 7) modulation for variable-length code is 17PP modulation (disclosed in Japanese Unexamined Patent Publication No. 11-346154/1999.

As disclosed in detail, variation in birefringence during one disc rotation is adjusted within ±20 nmpp (nano meter peak to peak) under double-pass measurements among birefringence components generated on the information-retrieval layer of the optical discs according to the present invention. The adjustments for decreasing variation in birefringence during one disc rotation suppresses variation in reproduced output, thus achieving high reproduction performance.

What is claimed is:

1. An optical disc comprising:
   a disc-like support base; and
   at least one disc-like information-retrieval layer having an almost same size as the support base and formed over the support base, the information-retrieval layer being thinner than the support base and made of a sheet cut out from a roll of a sheet material and cut into a disc-like sheet before formed over the support base so that the disc-like sheet exhibits a two-cycle variation in birefringence within ±20 nmpp (nano meter peak to peak) under double-pass measurements during one disc rotation, wherein the information-retrieval layer at least having a hard-coat layer.

2. The optical disc according to claim 1, wherein the sheet has a draw ratio adjusted so that the sheet exhibits variation in birefringence within ±20 nmpp (nano meter peak to peak) during one rotation under double-pass measurements.

3. The optical disc according to claim 1, wherein the sheet is made from a material selected from the group consisting of polycarbonate, polystyrene, amorphous polyolefine and acetate.

4. The optical disc according to claim 1 further comprising:

at least one information-recorded layer; and a bonding layer via which the information-retrieval layer and the information-recorded layer are stuck each other on the support base.

* * * * *